United States Patent
Waki et al.

(10) Patent No.: US 7,943,107 B2
(45) Date of Patent: May 17, 2011

(54) ISOTOPE ENRICHMENT METHOD

(75) Inventors: Masahide Waki, Izumiotsu (JP); Kazuhiro Miyamoto, Sakai (JP)

(73) Assignee: Stella Chemifa Corporation, Osaka (JP)

( * ) Notice: Subject to any disclaimer, the term of this patent is extended or adjusted under 35 U.S.C. 154(b) by 443 days.

(21) Appl. No.: 12/065,361

(22) PCT Filed: Sep. 8, 2006

(86) PCT No.: PCT/JP2006/317809
§ 371 (c)(1),
(2), (4) Date: Feb. 29, 2008

(87) PCT Pub. No.: WO2007/029797
PCT Pub. Date: Mar. 15, 2007

(65) Prior Publication Data
US 2009/0136407 A1 May 28, 2009

(30) Foreign Application Priority Data
Sep. 8, 2005 (JP) .................... 2005-260750

(51) Int. Cl.
*C01B 33/08* (2006.01)
(52) U.S. Cl. .................. 423/341; 250/282; 423/DIG. 7
(58) Field of Classification Search .............. 250/252.1, 250/281, 285; 423/341, DIG. 7
See application file for complete search history.

(56) References Cited

U.S. PATENT DOCUMENTS

| | | | |
|---|---|---|---|
| 3,365,573 A | 1/1968 | Davis et al. | |
| 6,146,601 A | 11/2000 | Abesadze et al. | |
| 6,800,827 B2 | 10/2004 | Yokoyama et al. | |
| 2003/0034243 A1 | 2/2003 | Yokoyama et al. | |

FOREIGN PATENT DOCUMENTS

| | | |
|---|---|---|
| JP | 2003-53153 A | 2/2003 |
| RU | 2170609 | 7/2001 |
| WO | WO 00/48941 | 8/2000 |

OTHER PUBLICATIONS

T. Abzianidze, et al, The Study of SiF4•Aliphatic Alcohols Complexes For the Process of Silicon Isotopess Separation, Georgian Academy of Sciences, I. Goverdtesteli Institute of Stable Isotopes, Received Jul. 9, 2000.

A. Yokoyama, et al., Silicon isotope separation utilizing infrared multiphoton dissociation of Si2F6 irradiated with two-frequency CO2 laser lights, Applied Physics B, Lasers and Optics 79, 883-889 (2004).

T. Abzianidze, et al., Physico-Chemical Characteristics of the Silicon Isotope Separation Process in the System SiF4-Complex of SiF4 with Aliphatic Spirits, Georgian Academy of Sciences, I. Gverdtesteli Institute of Stable Isotopes, Recieved Jul. 9, 2000.

*Primary Examiner* — Stuart Hendrickson
*Assistant Examiner* — Richard M Rump
(74) *Attorney, Agent, or Firm* — Knobbe, Martens, Olson & Bear, LLP

(57) ABSTRACT

An isotope enrichment method comprising the step of performing the isotope exchange between an aqueous solution containing at least two components each represented by the formula: $H_2O$—$H_2SiF_6.nSiF_4$ (wherein $n \geq 0$) and a gas containing $SiF_4$ to enrich a stable Si isotope.

6 Claims, 4 Drawing Sheets

ISOTOPE ENRICHMENT METHOD

This application is the U.S. National Phase under 35 U.S.C. §371 of International Application PCT/JP2006/317809, filed Sep. 8, 2006, which claims priority to Japanese Patent Application No. 2005-260750, filed Sep. 8, 2005. The International Application was published under PCT Article 21(2) in a language other than English.

TECHNICAL FIELD

The present invention relates to a silicon isotope enrichment method used in a semiconductor field, an optical field, or the like.

BACKGROUND ART

Natural silicon is composed of three kinds of stable isotopes (hereinafter, referred to as $^{28}$Si, $^{29}$Si, $^{30}$Si, respectively) of which the mass numbers are 28, 29 and 30. The stable isotopes $^{28}$Si, $^{29}$Si, $^{30}$Si exist in a ratio of 92.23%, 4.67% and 3.10% (atom %), respectively.

There is reported a single crystal prepared by highly enriched a single silicon isotope having improved thermal conductivity as compared with one having a natural ratio. Therefore, the single crystal is reasonably expected as a material contributing to higher speed, miniaturization, lower power consumption and improved stability of LSI. Silicon prepared by completely removing $^{29}$Si having a nuclear spin is a material which is most likely to realize a quantum computer proposed to allow ultrahigh-speed calculation.

It is necessary to establish a technique for mass manufacturing isotope-separated silicon at a low cost for promoting research and development in such a field, developing a new application, and expanding sales of devices or the like using isotope-concentrated silicon.

Examples of conventional techniques for the silicon isotope enrichment method include a distillation method, a centrifugal separation method, a laser decomposition method, an isotope exchange reaction method, and the like. However, since the distillation method provides an extremely small separation factor and a very long tower required for separation, the distillation method is hard to be accomplished as a commercial process. The centrifugal separation method requires a large-sized centrifugal separators and therefore high cost. The laser decomposition method provides a low yield, and therefore is unsuitable for mass production.

As the isotope exchange reaction method, there is disclosed, for example, a method using a complex of halogenated silicon or the like and $C_1$-$C_4$ alkyl alcohol or the like in U.S. Pat. No. 6,146,601 (Patent Document 1) Since silicon tetrafluoride, which is a kind of the halogenated silicon, is generally known to be reacted with water to be hydrolyzed (see the following chemical formula), the method prevents the hydrolysis using a prescribed organic solvent as a donor compound.

$3SiF_4 + 2H_2O \rightarrow 2H_2SiF_6 + SiO_2$      [Chemical Formula 1]

However, silicon tetrafluoride is known to be reacted with alcohols by the same mechanism as that of water under some operating conditions to be decomposed and generate alkyl orthosilicate and alkoxy fluorosilicate. Therefore, the chemical exchange method may not perform a stable isotope separation operation. Furthermore, the use of an organic solvent such as $C_1$-$C_4$ alkyl alcohol requires explosion-proof facilities and causes the increase of manufacturing cost.

Patent Document 1: U.S. Pat. No. 6,146,601

DISCLOSURE OF THE INVENTION

Problems to be Solved by the Invention

The present invention has been made in consideration of the above-mentioned problems, and it is an object of the present invention to provide an isotope concentration method capable of adopting a more convenient and stable system in an isotope exchange reaction method to massively perform silicon isotope concentration at a low cost.

Means for Solving the Problems

The present inventors have conducted studies for the silicon isotope enrichment method in order to solve the problems on the conventional method. As a result, the inventors have found that the problems can be solved by adopting the following constitution, and have accomplished the present invention.

That is to say, in order to achieve the above described object, the present invention provides an isotope enrichment method comprising the step of performing isotope exchange between an aqueous solution containing at least two components each represented by the formula: $H_2O$—$H_2SiF_6$·$nSiF_4$ (wherein $n \geq 0$) and a gas containing $SiF_4$ to concentrate a stable Si isotope.

The method uses isotope exchange reaction in an aqueous solution system as a basic principle. When an X element and an X* element which has a different mass from and the same chemical properties as the X element are generally changed to two kinds of compounds AX and BX*, and both the compounds are brought into contact with each other, the isotope exchange reaction occurs between the compounds (AX+BX*→AX*+BX). The difference of binding energies resulting from the mass difference of the elements causes slight difference in reaction velocity or equilibrium constant. A separation method which combines this difference in multiple stages is referred to as an isotope exchange reaction method.

The present invention uses an aqueous solution containing hydrofluoric acid as a donor in the isotope exchange reaction method using silicon tetrafluoride, and is considered to be based on the following equilibrium reaction. As a result of the isotope exchange reaction, an Si light isotope is enriched on an aqueous solution side, and an Si heavy isotope is enriched on a gas side. Specifically, for example, silicon having a natural ratio can be separated into an aqueous fluorosilicic acid solution containing highly enriched with $^{28}$Si and silicon tetrafluoride containing highly enriched with $^{29}$Si and $^{30}$Si. Alternatively, $^{29}$Si and $^{30}$Si enriched silicon tetrafluoride can be separated into an aqueous fluorosilicic acid solution containing enriched with $^{29}$Si to a higher concentration and silicon tetrafluoride containing enriched with $^{30}$Si to a higher concentration.

$(1+n)^x SiF_4 + H_2{}^y SiF_6 \cdot n^y SiF_4 aq. \leftrightarrow (1+n)^y SiF_4 + H_2{}^x SiF_6 \cdot n^x SiF_4 aq.$      [Chemical Formula 2]

wherein $n \geq 0$; x and y represent the mass number of the isotope; and the relationship of x<y is satisfied.

In the above described method, it is preferable for the $SiF_4$ is dissolved in a saturated state in the aqueous solution.

The use of the aqueous solution in which $SiF_4$ is saturated and which contains at least two of the components can constantly hold a gas-liquid composition in the isotope exchange reaction. This enables the operation of stable isotope concentration.

In the above described method, it is preferable for the aqueous solution has an azeotropic composition.

Since the gas-liquid composition is the same in the azeotropic composition, the composition can be constantly held in the isotope exchange reaction to enable the operation of the stable isotope enrichment.

Effect of the Invention

The present invention exhibits effects to be described below by the means described above.

That is, the present invention can provide a novel isotope enrichment method capable of enrichment and separating the silicon isotope by the isotope exchange reaction between the aqueous solution containing at least two components each represented by the formula: $H_2O$—$H_2SiF_6 \cdot nSiF_4$ (wherein $n \geq 0$) and the gas containing $SiF_4$. The method can perform the isotope enrichment of silicon massively at a low cost.

DESCRIPTION OF THE SYMBOLS

Figure 1:
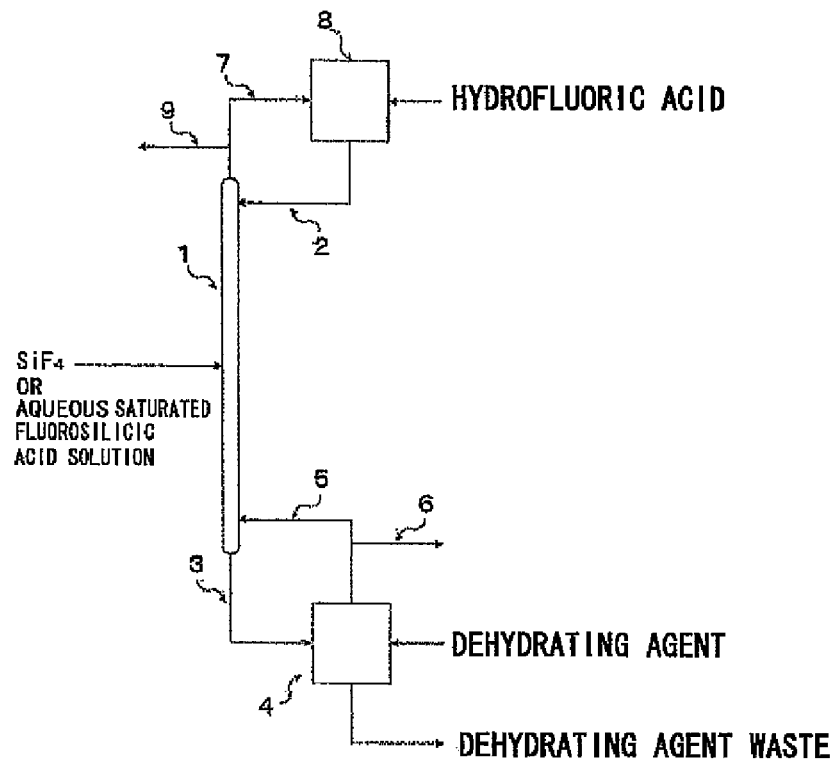
FIG. 1 is a flow sheet showing an example of a silicon isotope separation/enrichment apparatus according to an embodiment of the present invention.

1: exchange reaction column
2, 2': first liquid passage
3, 3': second liquid passage
4: gas generator
5, 5': first gas passage
6: second gas passage
7, 7': third gas passage
8: absorber
9: fourth gas passage
10: distillation column
11: condenser
12: reboiler
13: condensate receiving vessel
14: third liquid passage
21: silicon tetrafluoride
22: first exchange reaction column
22': second exchange reaction column
23: first liquid passage
24: first gas passage
25: second gas passage
25': third gas passage
26: second liquid passage
26': third liquid passage
27: gas generation column
28: concentrated sulfuric acid passage
29: fourth gas passage
30: waste sulfuric acid
31: scrubbing column
32: concentrated sulfuric acid
33: lighter isotope-enriched silicon tetrafluoride
34: absorber
35: hydrofluoric acid
36: cooler
37: heavier isotope-enriched silicon tetrafluoride
41 to 48: first to eighth exchange reaction columns

BEST MODE FOR CARRYING OUT THE INVENTION

An embodiment of the present invention will be described. An isotope enrichment method according to the embodiment separates and enriches an Si isotope using an isotope exchange method for gas-liquid contact in an aqueous solution system. The isotope exchange of the present invention is preferably performed by, for example, a gas-liquid contact method, and more preferably a gas-liquid countercurrent contact.

Silicon isotope enrichment by isotope exchange reaction in an aqueous solution system of the present invention can be performed using an apparatus shown in FIG. 1 as an example. The apparatus shown in FIG. 1 mainly includes an exchange reaction column 1, a gas generator 4, and an absorber 8. In the exchange reaction column 1, the isotope exchange reaction is performed between an aqueous solution containing at least two components each represented by the formula: $H_2O$—$H_2SiF_6 \cdot nSiF_4$ (wherein $n \geq 0$) and a gas containing silicon tetrafluoride. As this exchange reaction column 1, a tray column or a packed column can be used. In the gas generator 4, the gas containing silicon tetrafluoride is taken out from the aqueous solution withdrawn from the bottom of the exchange reaction column 1, and the gas is returned to the exchange reaction column 1. In the absorber 8, the gas containing silicon tetrafluoride collected from the top of the exchange reaction column 1 is absorbed in the aqueous solution containing hydrofluoric acid to prepare the aqueous solution containing at least two components each represented by the formula: $H_2O$—$H_2SiF_6 \cdot nSiF_4$ (wherein $n \geq 0$), and is returned to the top of the exchange reaction column 1.

Hydrofluosilicic acid is an aqueous solution of fluorosilicic acid represented by the formula: $H_2SiF_6$, and exists only as an aqueous solution. As the acid concentration of hydrofluosilicic acid increases, hydrofluosilicic acid absorbs silicon tetrafluoride in a large amount to become a compound represented by the general formula $H_2SiF_6 \cdot nSiF_4$. Since this compound has been believed to dissolve silica in an amount exceeding the theoretical amount in the history of research, the compound is referred to as high-silica fluorosilicic acid. Herein, n is 0 or more, and it is known that the value of n is increased to 1 from 0 as the acid concentration increases. However, when fluorosilicic acid and silicon tetrafluoride exist together in the aqueous solution, the detail of the equilibrium situation thereof is unknown. When the present inventors interpret that fluorosilicic acid of the preceding paragraph is partially decomposed into $SiF_4$ and HF in $H_2SiF_6 \cdot nSiF_4$, n may be more than 1.

As raw materials used for the isotope exchange reaction, for example, there can be used a gas containing silicon tetrafluoride and an aqueous solution containing at least two components of $H_2O$—$H_2SiF_6 \cdot nSiF_4$ ($n \geq 0$) absorbing silicon tetrafluoride to the saturated concentration (hereinafter, referred to as aqueous saturated fluorosilicic acid solution). When using the gas containing silicon tetrafluoride as the raw material, an aqueous saturated fluorosilicic acid solution can be prepared from this gas by the absorber 8. The isotope exchange reaction is performed between the gas containing silicon tetrafluoride and the aqueous saturated fluorosilicic acid solution. On the other hand, when using the aqueous saturated fluorosilicic acid solution as the raw material, the gas containing silicon tetrafluoride can be generated from this aqueous saturated fluorosilicic acid solution by the gas generator 4. The isotope exchange reaction is performed between the aqueous saturated fluorosilicic acid solution and the gas containing silicon tetrafluoride. Silicon tetrafluoride used as the raw material for the isotope exchange reaction is preferably highly purified. However, silicon tetrafluoride may contains impurities which does not cause the composition change of gas-liquid components in isotope enrichment such as an inert gas which does not cause reaction, absorption, decomposition, or the like with a gas and liquid used for the isotope exchange reaction. The content of silicon tetrafluoride contained in the gas is not particularly limited, and may be suitably set if needed.

The aqueous saturated fluorosilicic acid solution used for the raw material of the isotope exchange reaction preferably absorbs silicon tetrafluoride until the concentration of silicon tetrafluoride arrives to saturated concentration. If the aqueous solution can further absorb silicon tetrafluoride, sufficient isotope exchange reaction cannot be performed in the whole region of an exchange reactor having number of Plates set for achieving a desired enrichment to unable to complete a predetermined concentration. Heat generated when silicon tetrafluoride is absorbed may further change a liquid composition to unable to stabilize the enrichment operation. The aqueous saturated fluorosilicic acid solution used for the isotope exchange reaction preferably has high purity. However, the aqueous saturated fluorosilicic acid solution may contain impurities as components which do not hinder the exchange reaction operation.

The aqueous saturated fluorosilicic acid solution can be prepared by absorbing and dissolving silicon tetrafluoride in an aqueous solution containing water or hydrofluoric acid. Alternatively, the aqueous saturated fluorosilicic acid solution can be also prepared by reacting silicon dioxide with an aqueous solution containing hydrofluoric acid. The aqueous saturated fluorosilicic acid solution can be also obtained as a distillate by simple distillation of an aqueous fluorosilicic acid solution produced by reacting silicon dioxide with hydrofluoric acid. Herein, in preparing the aqueous saturated fluorosilicic acid solution, silicon dioxide may be deposited by hydrolyzing silicon tetrafluoride. In such a case, if the deposited silicon dioxide is filtered off, the aqueous saturated fluorosilicic acid solution can be used without problems.

The Si concentration in the aqueous saturated fluorosilicic acid solution is preferably higher. However, when the concentration of fluorosilicic acid excessively increases, crystalline hydrated fluosilicate such as $H_2SiF_6 \cdot 2H_2O$ and $H_2SiF_6 \cdot 4H_2O$ may be precipitated in a gel or solid form at some temperatures, and the aqueous saturated fluorosilicic acid solution may not be used as the raw material for the isotope exchange reaction. More specifically, the Si concentration is preferably 0.2% by weight to 13.1% by weight, and more preferably 12.0% by weight to 13.1% by weight when the average molecular weight of an Si isotope is 28.086 g/mol at a natural ratio. However, when other components which do not block the isotope enrichment operation except HF, $SiF_4$, $H_2O$ and a compound consisting of these components are mixed, a preferable Si concentration is decreased by only the mixing.

The aqueous saturated fluorosilicic acid solution often contains free hydrofluoric acid. However, as long as the aqueous saturated fluorosilicic acid solution can stably exist without using free hydrofluoric acid, free hydrofluoric acid may not exist.

The temperature of the aqueous saturated fluorosilicic acid solution supplied to the exchange reaction column 1 from the absorber is preferably similar to that of the gas containing silicon tetrafluoride supplied to the exchange reaction column 1 from the gas generator. Thereby, the temperature gradient in the exchange reaction column can be reduced or canceled, and the gas-liquid composition can be stably kept constant. As a result, stable isotope exchange reaction can be operated.

The operating temperature in the isotope exchange reaction using the aqueous saturated fluorosilicic acid solution is not particularly limited, and may be suitably set if needed. However, preferably, the concentration of the saturated fluorosilicic acid can be highly held at a temperature as low as possible in not less than the crystal precipitation temperature of the saturated fluorosilicic acid. It is preferable that the operating temperature is generally about 0° C. to about 50° C. In view of the keep warm and keep cool of the enrichment apparatus, the operating temperature is more preferably 10° C. to 30° C. A higher operating pressure is preferable since the operating pressure can increase the concentration of saturated fluorosilicic acid. The operating pressure may be generally atmospheric pressure to about 0.2 MPaG. However, since the aqueous fluorosilicic acid solution has corrosive properties to general industrial materials such as metal and glass, a series of apparatuses containing the isotope exchange reaction column require the lining or coating or the like such as a corrosive-resistant resin. Therefore, the operating temperature and the operating pressure may be limited according to the properties of the material of the apparatus.

When silicon tetrafluoride and the aqueous saturated fluorosilicic acid solution are supplied to the exchange reaction column 1, the isotope exchange reaction occurs between silicon tetrafluoride which ascends in the exchange reaction column 1 and the aqueous saturated fluorosilicic acid solution which descends in the exchange reaction column 1. Thereby, the Si lighter isotope is exchanged to the liquid side from the gas side, and the Si heavier isotope is exchanged to the gas side from the liquid side to advance the isotope enrichment. As a result, silicon tetrafluoride enriched with Si heavier isotope is taken out from the top of the exchange reaction column 1. The aqueous saturated fluorosilicic acid solution enriched with Si lighter isotope is taken out from the bottom of the exchange reaction column 1.

The aqueous saturated fluorosilicic acid solution enriched with Si lighter isotope is withdrawn from the bottom of the exchange reaction column 1, and is sent to the gas generator 4 via a second liquid passage 3. In the gas generator 4, the aqueous fluorosilicic acid solution is dehydrated and decomposed by a dehydrating agent such as concentrated sulfuric acid to generate silicon tetrafluoride enriched with Si lighter isotope. The enriched silicon tetrafluoride is partially discharged via a second gas passage 6 as a product. The remainder is returned to the bottom of the exchange reaction column 1 again via a first gas passage 5. Silicon tetrafluoride supplied to the bottom of the exchange reaction column passes upwardly in the exchange reaction column 1. Dehydrating agent waste is also discharged from the gas generator 4. The dehydrating agent maybe recycled and re-used in the process after regeneration by separating water and hydrogen fluoride from the dehydrating agent waste. Examples of the regeneration methods include distillation.

The dehydrating agent used for generating gas is not particularly limited as long as the dehydrating agent, which has a boiling point higher than that of water and has dehydrating actions, satisfies conditions that the dehydrating agent is not reacted with silicon tetrafluoride and does not generate by-products hindering the isotope enrichment operation. Specific examples thereof include sulfuric acid, phosphoric acid, perchloric acid, trifluoromethanesulfonic acid, Oleum, anhydrous phosphoric acid, and the like. When using sulfuric acid as the dehydrating agent, the concentration thereof is preferably 80 to 98% by weight, and more preferably 95 to 98% by weight. On the other hand, silicon tetrafluoride enriched with Si heavier isotope is discharged from the top of the exchange reaction column 1. Enriched silicon tetrafluoride is partially discharged as a product via a fourth gas passage 9. The remainder is sent to the absorber 8 via a third gas passage 7.

As the absorber 8, for example, an absorption column can be exemplified. A liquid containing hydrofluoric acid is supplied to the absorber 8. The composition and amount of the liquid containing hydrofluoric acid is equivalent to those for absorbing silicon tetrafluoride supplied to the absorber 8 and for forming the aqueous saturated fluorosilicic acid solution supplied to the exchange reaction column 1. The aqueous saturated fluorosilicic acid solution prepared in the absorber 8 is enriched with Si heavier isotope, and this aqueous saturated fluorosilicic acid solution is supplied to the exchange reaction column 1 via the first liquid passage 2.

Figure 2:
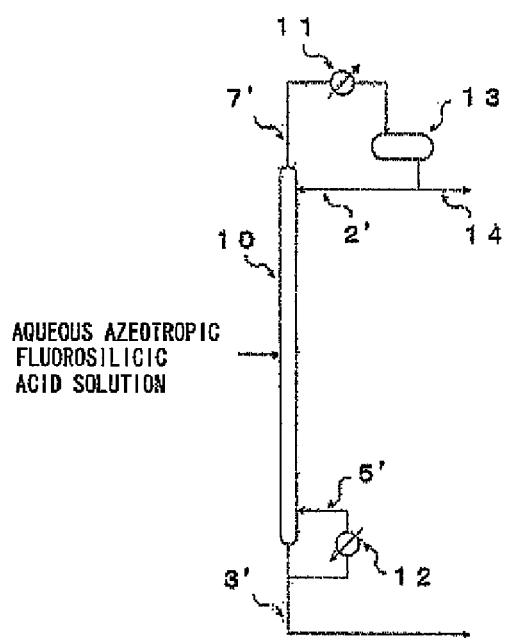
FIG. 2 is a flow sheet showing an example of a silicon isotope separation/enrichment apparatus according to another embodiment of the present invention.

For example, an apparatus shown in FIG. 2 can be used for the isotope enrichment operation when using the aqueous solution containing at least two components has an azeotropic composition (hereinafter, referred to as aqueous azeotropic fluorosilicic acid solution). In the enrichment apparatus, a distillation column 10 can be used as the exchange reaction column. This distillation column 10 is equipped with a reboiler 12 on a column bottom and with a condenser 11 on a top.

When the isotope enrichment is performed using the aqueous azeotropic fluorosilicic acid solution, it is preferable that a raw material supplied to the isotope exchange reaction column has an azeotropic composition. When silicon tetrafluoride or an aqueous fluorosilicic acid solution which has no azeotropic composition is supplied as the raw material, the azeotropic composition may collapse in the isotope exchange reaction column. As a result, stable isotope enrichment operation may not be performed. For example, it is known that hydrofluosilicic acid of 36% by weight containing hydrofluoric acid of 10% by weight, hydrofluosilicic acid of 41% by weight, or hydrofluosilicic acid of 13.3% by weight is an azeotropic mixture.

The operating pressure in the isotope exchange reaction using the aqueous azeotropic fluorosilicic acid solution is not particularly limited, and may be suitably set if needed. The operating pressure may be generally atmospheric pressure to about 0.2 MPaG. However, the operating pressure may be limited by an apparatus material such as a corrosion-resistance resin. The operating temperature is preferably a boiling point of the aqueous azeotropic fluorosilicic acid solution under the operating pressure. For example, it is known that the boiling point of hydrofluosilicic acid of 36% by weight containing hydrofluoric acid of 10% by weight is 116.1° C. at 759.7 mmHg.

The aqueous azeotropic fluorosilicic acid solution is partially vaporized while holding the azeotropic composition in the reboiler 12. The vapor ascends in the distillation column 10. The isotope exchange reaction is performed between the aqueous azeotropic fluorosilicic acid solution which descends in the distillation column 10 and the vapor. Thereby, the Si lighter isotope is exchanged to the liquid side from the gas side and the Si heavier isotope is exchanged to the gas side from the liquid side to advance the isotope enrichment. Therefore, the aqueous azeotropic fluorosilicic acid solution enriched with Si lighter isotope is discharged from the bottom of the distillation column 10. The vapor of the aqueous azeotropic fluorosilicic acid solution enriched with Si heavier isotope is discharged from the top of the distillation column 10. The vapor discharged from the top of the distillation column 10 is condensed in the condenser, and is returned to the top of the distillation column 10 again. The aqueous azeotropic fluorosilicic acid solution enriched with the Si lighter isotope is discharged out of a system via a second liquid passage 3'. The aqueous azeotropic fluorosilicic acid solution enriched with the Si heavier isotope is discharged out of a system via a third liquid passage 14.

Any of the isotope enrichment methods requires considerable time from the operation start to a predetermined enrichment. Thereby, the operation is continued at total reflux while stopping the supply of the raw material after starting the exchange reaction. It is confirmed that the isotope ratio becomes the predetermined enrichment on the top and bottom of the exchange reaction column, and it is necessary to supply the amount of the raw material and discharge products.

As described above, the isotope enrichment method according to the present invention can massively obtain isotopically enriched Si. Since the isotope enrichment method of the present invention is performed in the aqueous solution system, explosion-proof facilities required in using an organic solvent are not required. As a result, the equipment cost can be reduced and the safer operation can be attained. An Si form obtained by the isotope enrichment method of the present invention is silicon tetrafluoride and the aqueous fluorosilicic acid solution. Among these, silicon tetrafluoride is obtained by dehydrating and decomposing the aqueous fluorosilicic acid solution or by changing the aqueous fluorosilicic acid solution to an inorganic salt and thermally decomposing the inorganic salt. Furthermore, the obtained isotpically enriched silicon tetrafluoride can be taken out as Si by reduction due to hydrogen or by a Siemens method after reacting the isotpically enriched silicon tetrafluoride with HCl to convert it to trichlorosilane. When a single crystal is manufactured using Si enriched to a high concentration, the single crystal has a thermal conductivity which is more excellent than that of a single crystal obtained using Si of a natural ratio. This can contribute to the high integration or the like of a silicon semiconductor.

EXAMPLES

Preferred examples of this invention will be illustratively described in detail hereinafter. However, materials, blend amounts and others that will be described in the Examples do not limit to this invention unless any restrictive description is particularly included. Thus, these are mere explanatory examples.

Example 1

Figure 3:
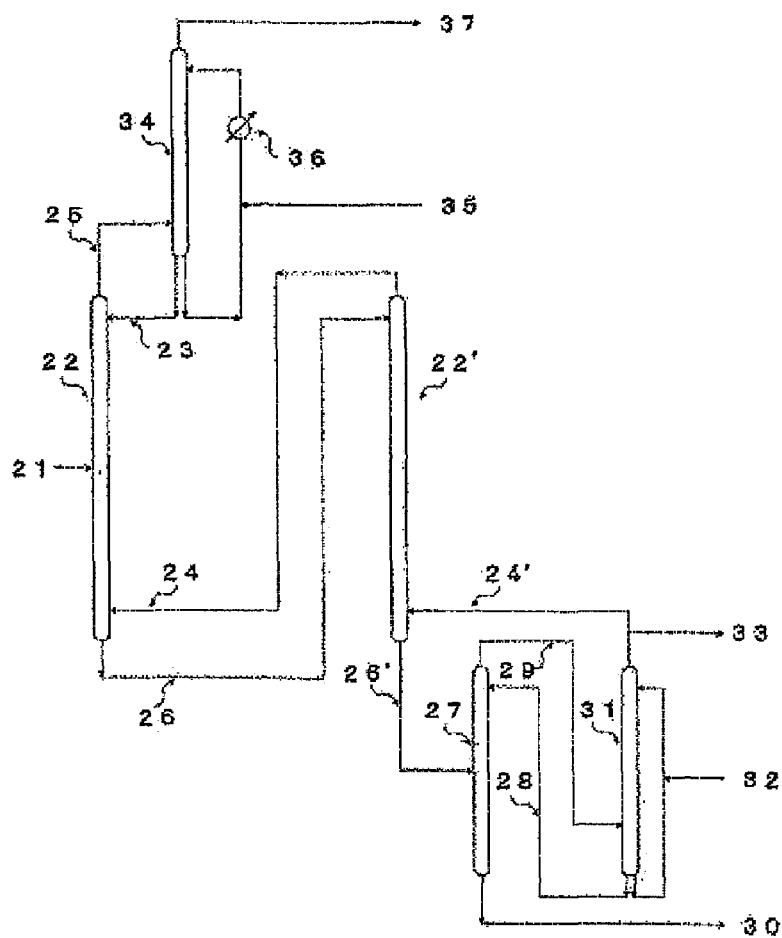
FIG. 3 is a flow sheet for illustrating a silicon isotope separation/enrichment experimental apparatus according to example of the present invention.

In this example, an Si isotope was separated and enriched using an isotope enrichment apparatus shown in FIG. 3. There was used two exchange reaction columns (a first exchange reaction column 22 and a second exchange reaction column 22') serially arranged, each of the exchange reaction columns having an inner diameter of 16 mm and a height of 3000 mm and made of fluoropolymer. In each of the exchange reaction columns, there was provided a Raschig ring having an outer diameter of 6 mm and made of fluoropolymer so that the packing height thereof was set to 2500 mm. As an absorber 34, a gas generation column 27 and a scrubbing column 31, there was used a column having an inner diameter of 25 mm and made of fluoropolymer. There was provided the same Raschig ring as one used for the exchange reaction columns so that the packing heights thereof were set to 600 mm, 400 mm and 800 mm, respectively.

First, into the absorber 34, 998.8 g of 18.9% by weight hydrofluoric acid was charged. While the hydrofluoric acid was circulated and cooled through a cooler 36, highly-pure silicon tetrafluoride 21 composed of Si having a natural ratio used as a raw material was supplied. In the absorber 34, hydrofluoric acid absorbed silicon tetrafluoride until the concentration of silicon tetrafluoride became saturated concentration. A container charged with about 100 g of pure water was temporarily connected to the downstream of the top line of the absorber 34. From the deposition of silicon dioxide according to the hydrolysis of silicon tetrafluoride in the container, the arrival of silicon tetrafluoride to saturated concentration was confirmed. Inside the absorber 34, the deposition of silicon dioxide was not observed. The temperature of the bottom of the absorber 34 was about 25° C. About 50 ml of the prepared aqueous high-silica fluorosilicic acid solution was sampled from the bottom of the absorber 34. As a result of composition analysis by alkali titration partially using the sample, the obtained aqueous solution was an aqueous high-silica fluorosilicic acid solution containing high-silica fluorosilicic acid ($H_2Si_2F_6 \cdot SiF_4$) having a concentration of 52.47% by weight and free hydrofluoric acid having a concentration of 2.15% by weight. From this composition, the amount of silicon tetrafluoride absorbed in fluosilicic acid was calculated to be 785.2 g, and the total amount of the obtained aqueous high-silica fluorosilicic acid solution was calculated to be 1784.0 g. The density of the obtained high aqueous silica fluorosilicic acid solution was 1.70 g/ml. The collected sample was partially used as a natural ratio sample in measuring an isotope ratio.

Next, 540.9 g of 98% by weight concentrated sulfuric acid was charged into the scrubbing column 31, and a pump started the circulation operation. About 300 ml of the aqueous high-silica fluorosilicic acid solution obtained by the operation was charged into the first exchange reaction column 22 and the second exchange reaction column 22' via a first liquid passage 23 and a second liquid passage 26, respectively, by the pump to complete the preparation of the isotope enrichment operation. The supply of the aqueous high-silica fluorosilicic acid solution was started at a flow rate of 8.4 ml/min (14.3 g/min) by the pump to the first exchange reaction column 22 via the first liquid passage 23 from the absorber 34, to the second exchange reaction column 22' via a second liquid passage 26 from the first exchange reaction column 22, and to the gas generation column 27 via a third liquid passage 26' from the second exchange reaction column 22'. Simultaneously, the supply of 98% by weight concentrated sulfuric acid was started at a flow rate of 15.7 ml/min (28.8 g/min) to the scrubbing column 31 from an external supply source and to the gas generation column 27 from the scrubbing column 31. The generation of silicon tetrafluoride was started by dehydrating and decomposing high-silica fluorosilicic acid in the gas generation column 27. The generating rate of silicon tetrafluoride in the gas generation column 27 became 6.3 g/min. The generated silicon tetrafluoride was supplied to the scrubbing column 31 via a fourth gas passage 29. In the scrubbing column 31, hydrogen fluoride and moisture which were accompanied to silicon tetrafluoride were removed by concentrated sulfuric acid. The total amount of silicon tetrafluoride scrubbed in the scrubbing column 31 was returned to the bottom of the second exchange reaction column 22' via a third gas passage 24'. At this time, the gas flow rate in the first exchange reaction column 22 and the second exchange reaction column 22' was 0.12 m/s. Waste sulfuric acid 30 was also discharged from the gas generation column 27.

On the other hand, simultaneously with the gas generation, the supply of 18.9% by weight hydrofluoric acid 35 was started at a flow rate of 7.5 ml/min (8.0 g/min) to the absorber 34. Silicon tetrafluoride collected from the top of the first exchange reaction column 22 was sent to the absorber 34 via a first gas passage 24. This silicon tetrafluoride was absorbed in hydrofluoric acid of 18.9% by weight, thereby preparing an aqueous high-silica fluorosilicic acid solution having the above composition. The prepared aqueous high-silica fluorosilicic acid solution was supplied to the top of the first exchange reaction column 22 via the first liquid passage 23.

The isotope exchange reaction was performed at atmospheric pressure, and the internal temperature of the exchange reaction column was 26 to 28° C. After the isotope exchange reaction for 12 hours by total reflux, the aqueous high-silica fluorosilicic acid solution supplied to the first exchange reaction column 22 from the bottom of the absorber 34 and the aqueous high-silica fluorosilicic acid solution supplied to the gas generation column 27 from the bottom of the second exchange reaction column 22' are respectively collected as a sample of about 20 ml. Then, 7.2 g of potassium hydroxide and 7.4 g of potassium fluoride were dissolved in about 200 ml of pure water in a poly-beaker, and were then sufficiently cooled in an iced water bath. 30 g of a sample of the aqueous high-silica fluorosilicic acid solution was added thereto, and all Si's in high-silica fluorosilicic acid were converted as potassium hexafluorosilicate ($K_2SiF_6$). The crystal of the obtained potassium hexafluorosilicate was filtered by a membrane filter having a pore size of 0.45 μm and made of fluoropolymer. The crystal was then dried and used as a sample for measuring an isotope ratio. A double-focusing mass spectrometer analyzed the silicon isotope abundance ratio of each of the measuring samples. Table 1 shows the results.

Table 1 showed that the Si lighter isotope was enriched in the sample obtained from the bottom part of the second exchange reaction column 22' by the isotope exchange reaction between the aqueous high-silica fluorosilicic acid solution and silicon tetrafluoride, and the Si heavier isotope was enriched in the sample obtained from the top of the first exchange reaction column of 22.

Example 2

Figure 4:
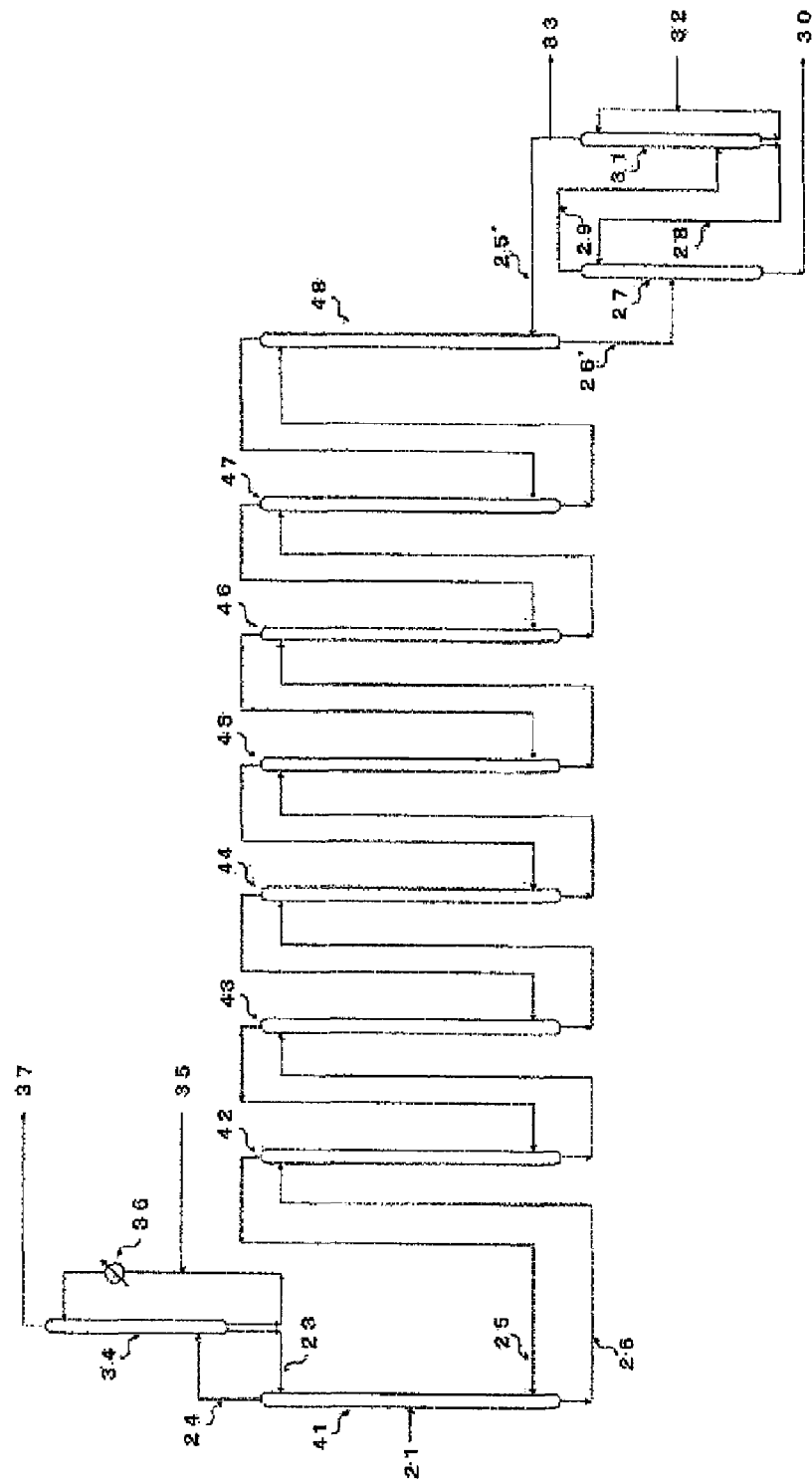
FIG. 4 is a flow sheet for illustrating another silicon isotope separation/enrichment experimental apparatus according to example of the present invention.

In this example, the same experiment as example 1 was conducted by using a first exchange reaction column 41 to eighth exchange reaction column 48 serially arranged, which are made of fluoropolymer in place of the first exchange reaction column 22 and second exchange reaction column 22' of the isotope enrichment apparatus shown in FIG. 3 (see FIG. 4). The inner diameter of each of the exchange reaction columns was 25 mm, and the height thereof was set to 3000 mm. A Raschig ring having an outer diameter of 6 mm and made of fluoropolymer was provided so that the packing height thereof was set to 2500 mm in each of the exchange reaction columns. That is, the total packing height was set to 20 meters.

There was used an aqueous high-silica fluorosilicic acid solution containing free hydrofluoric acid having a concentration of 2.75% by weight and high-silica fluorosilicic acid ($H_2SiF_6 \cdot SiF_4$) having a concentration of 54.65% by weight as a raw material. This aqueous high-silica fluorosilicic acid solution was charged so that the liquid level thereof became approximately constant in the bottom of the first exchange reaction column 41 to seventh exchange reaction column 47.

Next, by using column bottom pumps (not shown) respectively provided in the first exchange reaction column 41 to the seventh exchange reaction column 47, the supply of the aqueous high-silica fluorosilicic acid solution was sequentially started at a flow rate of 4.3 ml/min (7.0 g/min) to the second exchange reaction column 42 to the eighth exchange reaction column 48 of the subsequent stage. The aqueous high-silica fluorosilicic acid solution collected from the bottom of the eighth exchange reaction column 48 was supplied to the gas generation column 27. 98% by weight sulfuric acid was separately supplied at a flow rate of 7.2 ml/min (13.2 g/min) to the gas generation column 27. Thereby, the aqueous high-silica fluorosilicic acid solution was dehydrated and decomposed to generate silicon tetrafluoride at 3.2 g/min. The generated silicon tetrafluoride was passed through the scrubbing column 31 in which concentrated sulfuric acid was circulated to remove hydrofluoric acid accompanied. Silicon tetrafluoride was then supplied to the eighth exchange reaction column 48. At this time, the gas flow rate in the eighth exchange reaction column 48 was 25 mm/s.

After silicon tetrafluoride supplied to the eighth exchange reaction column 48 was sequentially supplied to the exchange reaction column of the proceeding stage from the seventh exchange reaction column 47, silicon tetrafluoride was finally supplied to the absorber 34 from the top of the first exchange reaction column 41. 21.3% by weight hydrofluoric acid was supplied at 3.5 ml/min (3.8 g/min) to the gas absorption column 34. Hydrofluoric acid absorbed silicon tetrafluoride to obtain an aqueous saturated high-silica fluorosilicic acid solution. The aqueous saturated high-silica fluorosilicic acid solution was supplied to the first exchange reaction column 41 from the bottom by a pump. In the absorber 34, the aqueous saturated high-silica fluorosilicic acid solution was cooled at 20° C., and was supplied to the first exchange reaction column 41. The operating pressure was set to atmospheric pressure.

After the isotope exchange reaction of 12 hours by total reflux, the aqueous high-silica fluorosilicic acid solution supplied to the first exchange reaction column 41 from the bottom of the absorber 34 and the aqueous high-silica fluorosilicic acid solution supplied to the gas generation column 27 from the bottom of the eighth exchange reaction column 48 were respectively sampled. These aqueous solutions were reacted with a mixture of potassium fluoride and potassium hydroxide to be collected as potassium hexafluorosilicate to obtain a sample for measuring an isotope ratio. A thermal ionization mass spectrometer (TIMS) analyzed the Si isotope abundance ratio of the sample. Table 1 shows the results.
[Deviation of Isotope Ratio from Natural Ratio]

The following Table 1 shows that the separation capacity of the isotope is improved by substantially extending the length of the exchange reaction column, that is, by enhancing the number of separation stages. However, in example 2, the flow rate of silicon tetrafluoride gas is reduced as compared with that of example 1. That is, since the operation time is the same, but the gas-liquid circulation amount is few, the column long ratio is not proportional to the isotope enrichment ratio.

TABLE 1

|  |  | Deviation of Isotope Ratio from Natural Ratio [%] | | |
|---|---|---|---|---|
|  |  | Δ30/28 | Δ29/28 | Δ29/30 |
| Example 1 | Sample of column Bottom | −2.94 | −1.99 | 0.96 |
|  | Sample of Column Top | 4.70 | 3.61 | −1.04 |

TABLE 1-continued

|  |  | Deviation of Isotope Ratio from Natural Ratio [%] | | |
|---|---|---|---|---|
|  |  | Δ30/28 | Δ29/28 | Δ29/30 |
| Example 2 | Sample of Column Bottom | −6.67 | −3.30 | 3.61 |
|  | Sample of Column Top | 8.60 | 4.50 | −3.78 |

Example 3

An operable composition range in Si isotope enrichment operation by the gas-liquid contact of an aqueous saturated high-silica fluorosilicic acid solution was investigated. Hydrofluoric acid having a predetermined concentration absorbed silicon tetrafluoride gas until the concentration of the silicon tetrafluoride gas became saturated concentration, and the composition of the aqueous saturated high-silica fluorosilicic acid solution was analyzed. The concentration of hydrofluoric acid was set to 10% by weight, 15% by weight, 20% by weight, 25% by weight, 30% by weight, 35% by weight and 40% by weight. While fluoropolymer container charged with 15.0 g of the hydrofluoric acid having each concentration was cooled from the exterior by iced water, silicon tetrafluoride was absorbed at 0.05 MPaG in a closing system. When the absorption was generally started, heat was generated by absorption heat, and the temperature of absorption liquid was risen. However, when the concentration of silicon tetrafluoride arrived to saturated concentration, the temperature of the absorption liquid was reduced by cooling from the outside. When the temperature of the aqueous high-silica fluorosilicic acid solution became 1.5° C. in this example, the operation was completed considering that the concentration of silicon tetrafluoride arrived to sufficient saturated concentration. Thereby, for example, when 30% by weight hydrofluoric acid absorbed silicon tetrafluoride until the concentration of the silicon tetrafluoride became saturated concentration, referring to the composition of the aqueous high-silica fluorosilicic acid solution at 1.5° C., the concentration of the high-silica fluorosilicic acid was 56.91% by weight, and the concentration of the free hydrofluoric acid was 6.59% by weight.

When the concentration of the hydrofluoric acid used as an absorbent was 20% by weight, 25% by weight or 30% by weight in the operation, no crystal was precipitated and a liquid of aqueous high-silica fluorosilicic acid solution was obtained. On the other hand, when the concentration of the hydrofluoric acid was 10% by weight or 15% by weight, silicon tetrafluoride was hydrolyzed, and white silicon dioxide was deposited as a solid. When the concentration of the hydrofluoric acid was 35% by weight or 40% by weight, a colorless and transparent crystal presumed to be $H_2SiF_6 \cdot 4H_2O$ was precipitated, and the absorption liquid was made into slurry.

Figure 5:
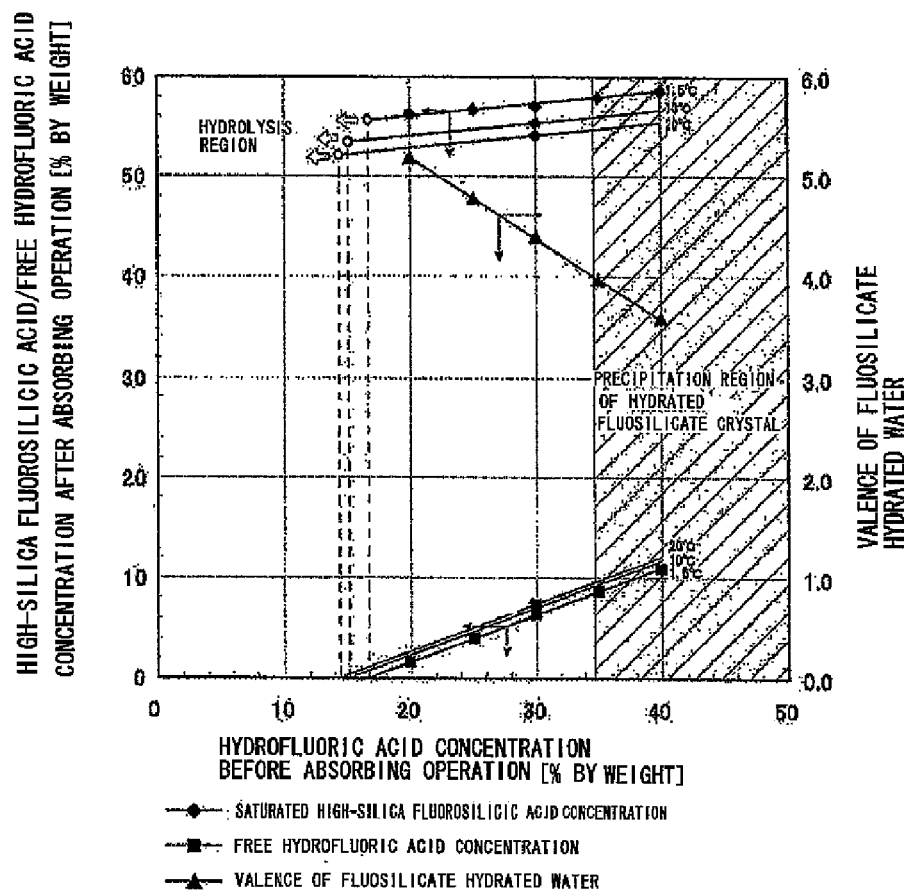
FIG. 5 is a graph for illustrating the composition range of an aqueous saturated high-silica fluorosilicic acid solution in silicon isotope enrichment operation according to example of the present invention.

FIG. 5 shows the relationship between the concentrations of the high-silica fluorosilicic acid and free hydrofluoric acid, and the valence m of hydrated water in calculating as $H_2SiF_6 \cdot mH_2O$ based on Si in the saturated high-silica fluorosilicic acid in the aqueous saturated high-silica fluorosilicic acid solution according to this example.

Example 4

In this example, the composition of an aqueous saturated high-silica fluorosilicic acid solution was investigated in the same manner as in example 3 except that the temperature of the aqueous high-silica fluorosilicic acid solution used in example 3 was changed to 10° C. from 1.5° C. As a result, for example, when 30% by weight hydrofluoric acid absorbed silicon tetrafluoride to saturated concentration, referring to the concentration of the aqueous high-silica fluorosilicic acid solution, the concentration of the high-silica fluorosilicic acid was 55.40% by weight, and the concentration of the free hydrofluoric acid was 6.98% by weight. FIG. 5 shows the results.

Example 5

In this example, the composition of an aqueous saturated high-silica fluorosilicic acid solution was investigated in the same manner as in example 3 except that the temperature of the aqueous high-silica fluorosilicic acid solution used in example 3 was changed to 20° C. from 1.5° C. As a result, for example, when 30% by weight hydrofluoric acid absorbed silicon tetrafluoride to saturated concentration, referring to the concentration of the aqueous high-silica fluorosilicic acid solution, the concentration of the high-silica fluorosilicic acid was 54.17% by weight, and the concentration of the free hydrofluoric acid was 7.32% by weight. FIG. 5 shows the results.

[Composition of Aqueous Saturated High-silica Fluorosilicic Acid Solution]

In a range shown by slash of FIG. 5, i.e., when the valence of fluosilicate hydrate was 4 or less, the crystal of $H_2SiF_6 \cdot 4H_2O$ was precipitated. Therefore, the inside of the column or piping may be plugged by the crystal precipitated when the aqueous high-silica fluorosilicic acid solution is in gas-liquid contact with the silicon tetrafluoride gas in the packed column or the like to complicate the continuation of the operation.

On the other hand, when the concentration of free hydrofluoric acid becomes 0% by weight or less, silicon tetrafluoride is hydrolyzed, and the solid of silicon dioxide is deposited. Therefore, the region where the concentration of free hydrofluoric acid becomes 0% by weight or less is also not suitable for the isotope exchange reaction of the present invention. Also, high operating temperatures decreases the amount of silicon tetrafluoride capable of being absorbed in hydrofluoric acid. This reduces the concentration of the high-silica fluorosilicic acid in the aqueous saturated high-silica fluorosilicic acid solution, thereby increasing the concentration of free hydrofluoric acid. Therefore, it is preferable that the composition range of the aqueous high-silica fluorosilicic acid solution in the Si isotope enrichment operation in the present invention is a range in which the concentration of free hydrofluoric acid exceeds 0% by weight and the valence of hydrated water exceeds 4 when being calculated as fluosilicate hydrated water.

Example 6

Hydrofluoric acid having a concentration of 20% by weight was used as an absorbent, and hydrofluoric acid absorbed silicon tetrafluoride to saturated concentration at 1.5° C. to produce an aqueous saturated high-silica fluorosilicic acid solution. Then, this aqueous saturated high-silica fluorosilicic acid solution was warmed in a closed system using warm water from the exterior, and the temperature thereof was set to 20° C. In this state, vapor and a liquid in the aqueous saturated high-silica fluorosilicic acid solution were separately sampled. The obtained sample was added to an aqueous potassium fluoride solution, and silicon tetrafluoride and fluorosilicic acid in the sample were converted into potassium hexafluorosilicate.

The obtained potassium hexafluorosilicate was filtered, and excessive potassium fluoride was sufficiently washed with pure water to be removed. Potassium hexafluorosilicate was then dried at 120° C. overnight. Dry Potassium hexafluorosilicate was used as a sample for measuring separation factor at 20° C. A thermal ionization mass spectrometer (TIMS) analyzed the Si isotope abundance ratio of the sample. From the analysis result, separation factor α in systems were calculated. These values are shown with the composition of the corresponding aqueous saturated high-silica fluorosilicic acid solution of 1.5° C. in the following Table 2.

Example 7

In this example, potassium hexafluorosilicate was obtained in the same manner as in example 6 except that the concentration of hydrofluoric acid was changed to 25% by weight. Furthermore, the separation factor α of $^{28}Si$ was calculated in the same manner as in example 6 by using this potassium hexafluorosilicate as a sample. The following Table 2 shows the results.

Example 8

In this example, potassium hexafluorosilicate was obtained in the same manner as in example 6 except that the concentration of hydrofluoric acid was changed to 30% by weight. Furthermore, the separation factor α of $^{28}Si$ was calculated in the same manner as in example 6 by using this potassium hexafluorosilicate as a sample. The following Table 2 shows the results.

TABLE 2

| | Aqueous High-silica Fluorosilicic Acid Solution | | |
|---|---|---|---|
| | $H_2SiF_6 \cdot SiF_4$ (% by weight) | Free HF (% by weight) | Separation Factor α of $^{28}Si$ |
| Example 6 | 56.14 | 1.53 | 1.021 |
| Example 7 | 56.69 | 3.97 | 1.019 |
| Example 8 | 56.91 | 6.59 | 1.016 |

Example 9

15.0 g of silicon dioxide was reacted with 85.0 g of 47.1% by weight hydrofluoric acid to synthesize 36% by weight hydrofluosilicic acid (azeotropic composition) containing 10% by weight free hydrofluoric acid. Next, fluoropolymer container charged with 60.0 g of hydrofluosilicic acid having an azeotropic composition was heated from the outside using thermal oil (130° C.) to subject hydrofluosilicic acid to a simple distillation. The generated vapor was passed through fluoropolymer condenser through which cooling water was passed to be condensed and to be collected. The boiling point of the hydrofluosilicic acid was almost fixed at about 116.3° C. during distillation. The compositions of the distillate and the residue after distillation were analyzed by alkali titration to confirm that the composition was not changed as compared with a raw material before distillation.

Then, the distillate and the residue were partially sampled, and were added to an aqueous potassium fluoride solution to obtain potassium hexafluorosilicate. Furthermore, potassium hexafluorosilicate was filtered, and excessive potassium fluoride was sufficiently washed with pure water to be removed. Potassium hexafluorosilicate was then dried at 120° C. overnight. Dry Potassium hexafluorosilicate was used as a sample for measuring a separation factor at 20° C. The TIMS analyzed the Si isotope abundance ratio of the sample. From the analysis result, separation factors α of $^{28}$Si in systems were calculated. The results are shown with composition of hydrofluosilicic acid used for the experiment in the following Table 3.

TABLE 3

| | Aqueous Azeotropic Fluorosilicic Acid Solution | | |
|---|---|---|---|
| | $H_2SiF_6$ (% by weight) | Free HF (% by weight) | Separation Factor α of $^{28}$Si |
| Example 9 | 36.0 | 10.0 | 1.022 |

The invention claimed is:

1. An isotope enrichment method by performing isotope exchange between an aqueous solution containing a component represented by the formula: $H_2SiF_6 \cdot nSiF_4$ (wherein $n \geq 0$) and a gas containing $SiF_4$ to enrich a Si lighter isotope in the solution and a Si heavier isotope in the gas, comprising;

(i) providing the gas to the bottom of an exchange reaction column and the aqueous solution to the top of the exchange reaction column, thereby causing the isotope exchange through gas-liquid counter current contact such that the Si lighter isotope in the gas is swapped with the Si heavier isotope in the solution;

(ii) isolating a gas containing $SiF_4$ from the aqueous solution recovered from the bottom of an exchange reaction column;

(iii) returning the gas to the exchange reaction column.

2. The isotope enrichment method according to claim 1, wherein the $SiF_4$ is dissolved in a saturated state in the aqueous solution.

3. The isotope enrichment method according to claim 1, wherein the aqueous solution has an azeotropic composition.

4. The isotope enrichment method according to claim 1, wherein the isotope enrichment is performed on a plurality of serially arranged exchange reaction columns.

5. The isotope enrichment method according to claim 1, wherein a distillation column is used in place of the exchange reaction column.

6. The isotope enrichment method according to claim 5, wherein the distillation column is equipped with a reboiler and a condenser thereto.

* * * * *

UNITED STATES PATENT AND TRADEMARK OFFICE
CERTIFICATE OF CORRECTION

PATENT NO. : 7,943,107 B2
APPLICATION NO. : 12/065361
DATED : May 17, 2011
INVENTOR(S) : Masahide Waki et al.

It is certified that error appears in the above-identified patent and that said Letters Patent is hereby corrected as shown below:

At Page 1, (Item 56), Column 2, line 13, Under Other Publications, change "Isotopess" to --Isotopes--.

At Page 1, (Item 56), Column 2, line 14, Under Other Publications, change "Goverdtesteli" to --Gverdtsiteli--.

At Page 1, (Item 56), Column 2, line 22, Under Other Publications, change "Gverdtesteli" to --Gverdtsiteli--.

At Page 1, (Item 56), Column 2, line 23, Under Other Publications, change "Recieved" to --Received--.

At Column 1, line 51, After "1)" insert --.--.

At Column 8, line 36 (Approx.), change "isotpically" to --isotopically--.

At Column 8, line 38 (Approx.), change "isotpically" to --isotopically--.

At Column 16, line 17, In Claim 4, change "enrichiment" to --enrichment--.

Signed and Sealed this
Twenty-first Day of August, 2012

David J. Kappos
*Director of the United States Patent and Trademark Office*